May 19, 1970     R. CANON ETAL     3,512,238
METHOD FOR FABRICATING RADIATORS
Filed March 31, 1965

INVENTORS
Raymond Canon
Marcel Bouvier
by McDougall, Hersh & Scott
Att'ys

United States Patent Office 3,512,238
Patented May 19, 1970

3,512,238
METHOD FOR FABRICATING RADIATORS
Raymond Canon, Paris, and Marcel Bouvier, Viroflay, France, assignors to L'Aluminium Francais and Compagnie Generale du Duralumin et du Cuivre
Filed Mar. 31, 1965, Ser. No. 444,197
Claims priority, application France, Feb. 26, 1965, 7,177
Int. Cl. B21d 53/04
U.S. Cl. 29—157.3                                7 Claims

ABSTRACT OF THE DISCLOSURE

A process for making a radiator wherein sheets of metal are welded at their edges and along intermediate lines. Fluid pressure is introduced between the sheets to provide passages and end chambers between the sheets in the unwelded areas. A plurality of sheet assemblies are then joined together and communication is provided between the several chambers by boring through the chamber walls so that the passages are interconnected for the flow of heated fluids.

---

The present invention relates to a novel process for making radiators and to the radiators produced by means of the process.

Radiators have previously been made by fixing elements between two water spaces, the elements comprising tubes arranged in parallel and joined by small fins designed to enlarge the heat transmitting surface. Such constructions have the disadvantage of being heavy, difficult to manufacture and expensive.

It is one object of this invention to provide a process for constructing a novel type of radiator which avoids the drawbacks referred to in that the radiator is light, is easy to produce, and is reasonably priced.

It is also an object of this invention to produce radiators which are characterized by the above features whereby economies and convenience are realized during use of the radiators.

Figure 1:
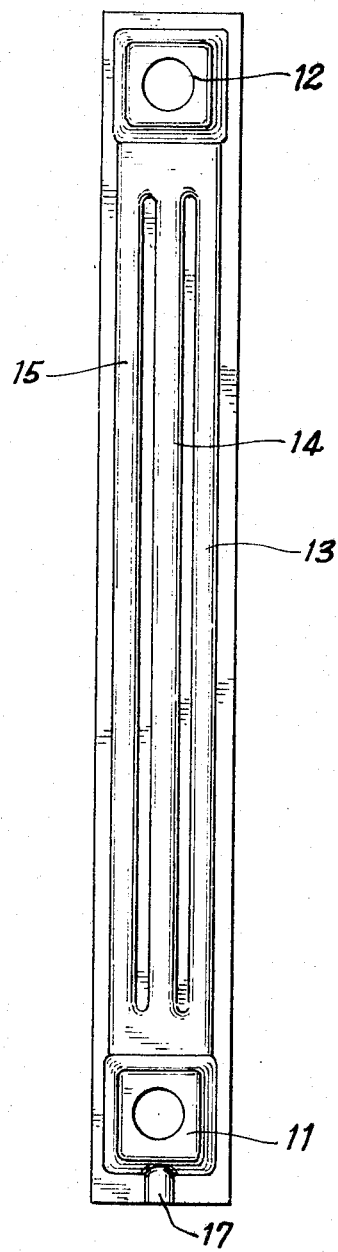
Figure 2:
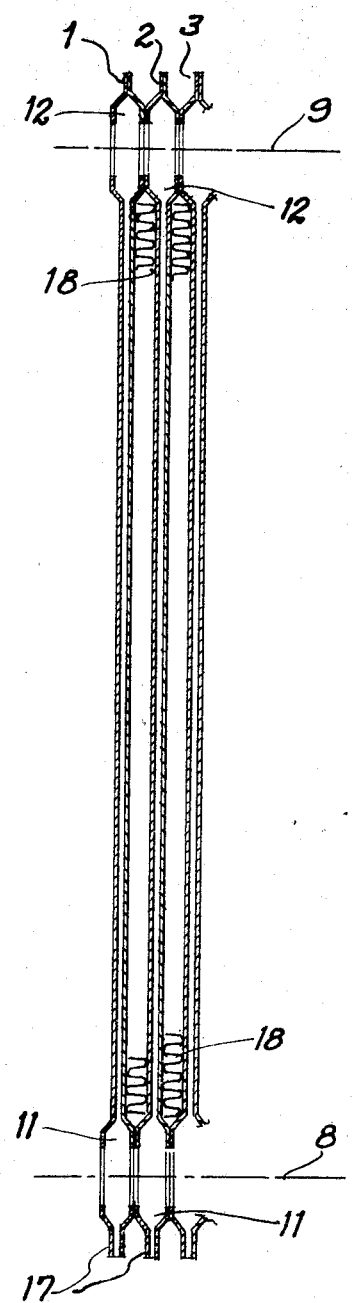

These and other objects will appear hereinafter and for purposes of illustration but not of limitation, a specific embodiment of the invention is shown in the accompanying drawing in which:

FIG. 1 is a plan view of a radiator construction produced in accordance with this invention; and, FIG. 2 is a cross-sectional view of the construction shown in FIG. 1.

The process of this invention generally comprises a system for making a light, easily produced and reasonably priced radiator having a plurality of elements with each element comprising an upstream drum or collector conduit, a downstream drum or conduit, and tubes discharging at each end into the drums. Each radiator element is preferably obtained by the so-called "roll-bond" process, in the final assembly, and each of the elements is fixed to an adjacent element. The attachment involves the connection of an upstream drum to an adjacent upstream drum and a downstream drum to an adjacent downstream drum. In the system, a gas such as air is introduced through the "roll-bond" pressurizing pipe, the pipe is closed by any known means such as mechanical crushing, welding or soldering, and then the elements are brazed to one another by any suitable means such as furnace brazing or brazing in molten salt. A passage is finally formed through all the upstream drums on the one hand and through all the downstream drums on the other.

The "roll-bond" method use to make the radiator elements has the great advantage of being simple in operation and requires only a minimum of material. To accomplish this a cross section of the drums and the tubes is drawn on one sheet, with anti-weld ink. This cross section is illustrated by the areas to which the reference numerals 11, 12, 13, 14, 15 and 17 are directed in FIG. 1. Thus the ink is located in those areas which will eventually form the tubes and the end chambers or drum. When the ink has been applied, the corresponding sheet, with or without ink in the same areas, is placed over the first sheet. The rolled unit is reheated or annealed, the pipe 17 is opened and a hollow spindle or needle is placed therein. The unit is placed between the plates of a press, and then a fluid such as water, oil or compressed air is injected under pressure into the hollow spindle. This causes plastic deformation of all the non-welded portions, i.e. the portions coated with ink, until they come into contact with the plates of the press. The "roll-bond" fluid is thereupon evacuated, and the pipe 17 is mechanically crushed and/or closed by welding.

The various radiator elements 1, 2, etc. are then placed one against the other as shown in FIG. 2 and brazed or welded together in a furnace or in molten salt. The heat transmitting surface may be enlarged by placing an insert 18 betwen pairs of consecutive elements. During the welding process the air imprisoned in each of the elements is expanded by the rise in temperature so that the elements are firmly pressed against one another and a perfect weld in obtained. This process may be avoided if the sheets to be welded together are made sufficiently rigid and self-sustaining. There is then no point in closing the pipe 17.

Borings are made along the axes 8 and 9 to connect the upstream drums on the one hand and the downstream drums on the other so as to form the water conduits interconnecting spaces of the radiator elements. This is preferably done with a trepan or boring bit with suction so as to prevent the pieces taken out and the borings from dropping inside the apparatus. Tubes may be welded or soldered at the outer openings to act as inlet and outlet means for the water. Other ultrarapid boring processes may be provided.

As noted above, in an embodiment which applies particularly where the "roll-bond" fluid employed is a gas, the fluid is kept in the radiator elements so as to press the elements against one another when they are brazed. This is accomplished by closing the pipe 17 before brazing.

The apparatus is preferably made of a metal or alloy which is a good conductor of heat, such as copper, zinc, aluminum, magnesium, iron or their alloys. In the specific example to be described, the apparatus is made of an aluminum alloy having sufficient strength, such as an alloy containing one percent manganese.

The thicknesses of the sheets mentioned below are given solely by way of example and are not restrictive. The process may be applied equally well to thicker or thinner sheets.

A sheet 1.5 mm. thick was brushed to obtain a clean surface. The pattern referred to was drawn on the sheet with anti-weld ink. Another similar sheet was also brushed and then placed on the first, to which it was welded at two points. The two sheets were heated to about 450° C. and hot-rolled to a total thickness of 0.9 mm., then rolled again to a thickness of 0.6 mm. The two sheets were intimately welded at the places not coated with anti-weld ink.

The assembly was then reheated and the pipe 17 was located and opened with a pneumatic punch so that a hollow spindle or needle could be placed therein. The resultant sheet was then placed between the plates of a press, comprising a molding matrix, the plates being spaced apart at each point by a distance corresponding to the height of the desired passages. Oil, water or compressed air was then injected through the hollow spindles at a pressure of the order of 100 to 180 bars, producing plastic deformation in the non-welded portions, corresponding to the shape of the matrices.

It is also possible to use a press having flat plates, in which case the plates are first spaced apart by the height to be given to the passages when pressurized for the first time. After formation of the passages, the plates are spaced apart by a distance equal to the height of the drums 11 and 12 and wedges or chocks are put in place to cover the locations of the tubes 13, 14 and 15. When the high pressure is restored, the drums are expanded to the desired point. The passages are emptied of fluid, air is introduced into them, and then the pipe 17 is closed by mechanical crushing and soldering or welding. If the "roll-bond" fluid is itself a gas, the pressure should be partially or totally relieved before closing of the pipe 17.

As noted, the individual elements thus obtained are assembled by brazing in a furnace or in molten salt, and the processing may include plating of a filler metal onto the items to be joined.

In furnace brazing the flux, in emulsion or water or dissolved in a solvent such as methyl, ethyl or propyl alcohol or mixtures thereof, is positioned at the places to be joined, i.e., at 11 and 12. The whole unit is then heated in a furnace to about 600° C., and the drums are welded or soldered to one another as shown in FIG. 2. If inserts such as 18 have been provided, the areas of contact are also coated with flux.

In the case of brazing in molten salt, the items are placed in a bath of pickling or cleaning salt which at the same time acts as a source of heat.

The holes bored along the axes 8 and 9 provide communication between all the upstream drums 11 and all the downstream drums 12. Where a boring bit is employed for this purpose, it is preferably in the form of a toothed ring mounted on a tubular support. The drill bit used is preferably formed so that particles of metal will be directed inwardly toward the hollow center of the bit and sucked through the bit shaft, in the conventional manner, to avoid collecting of the pieces in the drums 11 and 12.

As indicated, inlet and outlet pipes for the water are welded or soldered onto the orifices of the resultant upstream and downstream water spaces. In some instances, it may be preferable to bore a hole only in one outer wall and to weld or solder only one inlet or outlet pipe onto each of the ends of the construction.

The great advantage of the process, apart from the case with which it enables the surfaces to be brazed to be applied to one another, is that it avoids introducing brazing fluxes inside the elements, thus making it unnecessary to rinse out the inside of the radiator at the end of the operation.

It has also been found, when applying the process, that in certain cases radiator elements made by the "roll-bond" process were not equally inflated although the conditions of manufacture and use were apparently identical. In tests carried out on elements with particularly thin walls, certain elements were found to be excessively inflated and were found to crush adjacent elements which were only slightly inflated. These differences appear to be due to the fact that at brazing temperatures, the walls of the element or the lines joining them become more or less permeable to the fluid, generally air, imprisoned within the "roll-bond" sheets and pressurized in the brazing operation. This results in leakages which may vary greatly from one element to another.

In the case of radiator elements made from an aluminum alloy with about one percent of manganese, it was almost impossible to braze elements with a wall thickness of less than 0.3 mm. with industrial regularity by the process described above. For thicknesses equal to or above this value, results remain good.

To avoid the problems discussed above even where thin sheets are utilized, free passage for the expanding fluid within the construction is provided. Thus, intercommunication is provided between elements when the construction is placed in the furnace or in the bath of salts in which brazing is carried out. The passage of fluid between elements can be accomplished by forming an aperture of very small diameter, of the order of 0.1 to 2 mm. in the adjoining walls of the drums 11 and 12 at the ends of the elements. The apertures may be formed between all the upstream and downstream drums or through only one of these groups.

As an alternative, an additional temporary nozzle may be associated with at least one of the groups of drums. This nozzle may comprise a stainless steel tube extending through the adjoining drum walls. The tube may be equipped with a tap to regulate the leakage discharge.

A further alternative involves positioning on at least one of the group of drums a pad of porous inert material such as a compacted fragment of kieselguhr, porcelain or other similar materials.

The provision of a leak passage in the manner described makes it possible to use elements with very thin walls, which cannot possibly be obtained with regularity if the elements are perfectly tight. This also enables the process to be applied to elements in which the walls to be brazed together are characterized by projections or uneven surfaces. If the process were applied to such elements in a perfectly tight state, the projections would be crushed even where the wall thicknesses are far above the 0.3 mm. limitation previously indicated.

It should be noted that the fluid imprisoned in the "roll-bond" sheets may be either the "roll-bond" injection fluid itself or may be a gas such as air, which is introduced when the injection fluid has been emptied out.

It will be understood that various changes and modifications may be made in the above described process and in the radiators produced thereby which provide the characteristics of this invention without departing from the spirit thereof, particularly as defined in the following claims.

That which is claimed is:

1. A process for making a radiator which includes a plurality of assembled elements comprising an upstream conduit, a downstream conduit, and tubes discharging at each end into said conduits, said process comprising the steps of providing sheets of metal to be used for forming the elements, joining said sheets by welding the sheets at their peripheral edges and also along lines which extend longitudinally of the sheets and which are defined intermediate the side, bottom and top edges of the sheets, providing an opening at one of said edges for communication with the unwelded areas between the sheets, introducing fluid under pressure into said opening for parting the sheets in said unwelded areas to thereby provide elements defining internal, longitudinal passages which form said tubes and chambers at the opposite ends of the passages for forming said conduits, welding a plurality of said elements together in side-by-side relationship with the respective chambers at the ends of the elements being aligned with each other, closing off said opening at said edge subsequent to introduction of the pressure fluid to form each element but before welding thereby to entrap the fluid within the element, said entrapped pressure fluid imparting self-sustaining characteristics to the elements during the welding operation, and forming communicating openings through the walls defining the chambers to thereby provide said conduits.

2. A process in accordance with claim 1 including the step of inserting heat conducting members between adjacent elements in the welded assembly.

3. A process in accordance with claim 1 wherein said conduits are formed by boring passages through the opposite ends of each of said elements in the welded assembly.

4. A method in accordance with claim 3 wherein the passages are formed by means of a boring bit which comprises an air suction conduit whereby all material removed from the elements during boring will be removed from the welded assembly.

5. A process in accordance with claim 1 including the step of forming an opening between the interiors of respective elements during welding of the elements into the radiator assembly whereby fluids contained within the elements can freely pass therebetween for equalization of pressure during the welding operation.

6. A process in accordance with claim 5 including the steps of forming passages in the adjoining walls of said elements adjacent said conduits at the opposite ends of the elements for providing said equalization of pressure.

7. A process according to claim 5 including the step of fixing a temporary nozzle member adjacent the area at the ends of said elements to be occupied by said conduits for thereby providing said equalization of pressure.

References Cited

UNITED STATES PATENTS

| | | | |
|---|---|---|---|
| 1,847,176 | 3/1932 | Frame. | |
| 2,759,247 | 8/1956 | Grenell et al. | |
| 3,104,701 | 9/1963 | Jacoby | 165—148 |
| 3,153,447 | 10/1964 | Yoder et al. | 165—170 |
| 3,182,380 | 5/1965 | Oddy | 29—157.3 |
| 3,207,216 | 9/1965 | Donaldson | 165—148 |
| 2,462,136 | 2/1949 | Smith. | |
| 2,991,047 | 7/1961 | Bailys. | |
| 3,053,514 | 9/1962 | Grenell. | |
| 2,926,003 | 2/1960 | Pulsifer. | |

JOHN F. CAMPBELL, Primary Examiner

D. C. REILEY, Assistant Examiner

U.S. Cl. X.R.

29—469; 113—118